US008933970B2

(12) United States Patent
Saklatvala et al.

(10) Patent No.: US 8,933,970 B2
(45) Date of Patent: Jan. 13, 2015

(54) CONTROLLING AN AUGMENTED REALITY OBJECT

(75) Inventors: George Saklatvala, Cambridge (GB); Stephen Christopher Davis, Cambridge (GB); Matthew Dominic Sullivan, Cambridge, CA (US); Tristan Peter Melen, Ely (GB)

(73) Assignee: Longsand Limited, Cambridge (GB)

( * ) Notice: Subject to any disclaimer, the term of this patent is extended or adjusted under 35 U.S.C. 154(b) by 185 days.

(21) Appl. No.: 13/610,791

(22) Filed: Sep. 11, 2012

(65) Prior Publication Data

US 2014/0071164 A1    Mar. 13, 2014

(51) Int. Cl.
*G09G 5/00* (2006.01)

(52) U.S. Cl.
USPC ............ 345/633; 345/619; 345/632; 345/672

(58) Field of Classification Search
USPC ................................ 345/619, 632, 633, 672
See application file for complete search history.

(56) References Cited

U.S. PATENT DOCUMENTS

| | | | |
|---|---|---|---|
| 6,941,248 B2 | 9/2005 | Friedrich et al. | |
| 7,348,963 B2 | 3/2008 | Bell | |
| 2002/0186221 A1* | 12/2002 | Bell | 345/474 |
| 2006/0139314 A1* | 6/2006 | Bell | 345/156 |
| 2012/0062736 A1* | 3/2012 | Xiong | 348/143 |
| 2012/0129605 A1 | 5/2012 | Livet et al. | |

OTHER PUBLICATIONS

Lasinger, K. et al.; "Evaluating Camera-based Methods for Mobile Markerless Fingertip Detection": 2012.

Smith, R. et al.; "Hand Tracking for Low Powered Mobile AR User Interfaces"; 2005; 10 pages.
Youssef, K. et al.: "Bare Hand Tracking"; 6 pages.
Lee, T. et al.; "Handy AR: Markerless Inspection of Augmented Reality Objects Using Fingertip Tracking"; Jul. 22, 2007; 8 pages.
Mendez, E. et al.; "Importance Masks for Revealing Occluded Objects in Augmented Reality"; Aug. 26, 2009; 2 pages.
Strange, A. "AR Glasses Let You Control Virtual Objects with Your Fingertips"; Jan. 28, 2013; 4 pages.

* cited by examiner

*Primary Examiner* — Maurice L McDowell, Jr.
(74) *Attorney, Agent, or Firm* — Kraig Jakobsen

(57) ABSTRACT

Techniques for controlling an augmented reality object are described in various implementations. In one example implementation, a method may include receiving an initialization image captured by an image capture device, the initialization image depicting a background and being free of foreground objects positioned between the background and the image capture device. The method may also include receiving a plurality of subsequent images captured by the image capture device over a period of time, the plurality of subsequent images depicting the background and a foreground object, the foreground object being positioned between the background and the image capture device. The method may also include comparing the initialization image to the plurality of subsequent images to determine positioning of the foreground object over the period of time. The method may also include controlling an augmented reality object based on the positioning of the foreground object over the period of time.

14 Claims, 4 Drawing Sheets

CONTROLLING AN AUGMENTED REALITY OBJECT

BACKGROUND

Augmented reality refers to a technology platform that merges the physical and virtual worlds by augmenting real-world physical objects with virtual objects. For example, a real-world physical newspaper may be out of date the moment it is printed, but an augmented reality system may be used to recognize an article in the newspaper and to provide up-to-date virtual content related to the article. While the newspaper generally represents a static text and image-based communication medium, the virtual content need not be limited to the same medium. Indeed, in some augmented reality scenarios, the newspaper article may be augmented with audio and/or video-based content that provides the user with more meaningful information.

Some augmented reality systems operate on mobile devices, such as smartphones or tablets. In such systems, the mobile device may display its camera feed, e.g., on a touch-screen display of the device, augmented by virtual objects that are superimposed in the camera feed. In the newspaper example above, a user may point the mobile device camera at the article in the newspaper, and the mobile device may show the camera feed (i.e., the current view of the camera, which includes the article) augmented with a video or other virtual content, e.g., in place of a static image in the article. This creates the illusion of additional or different objects than are actually present in reality.

DETAILED DESCRIPTION

Figure 1A:
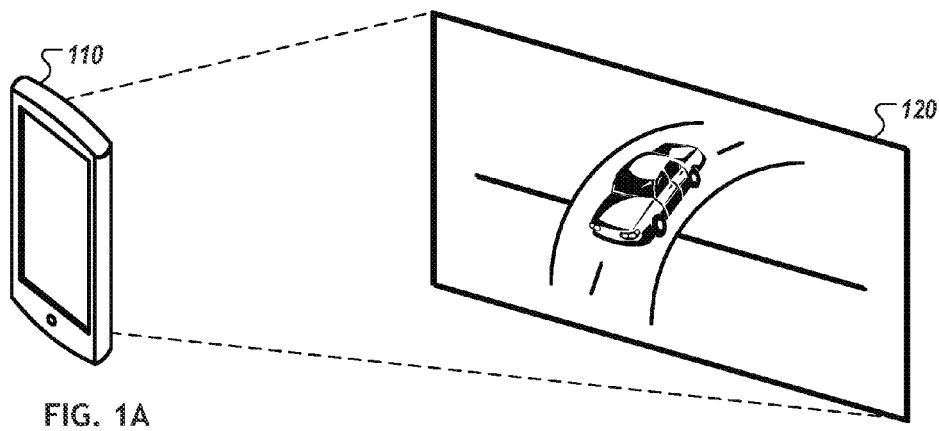
FIGS. 1A-1C are conceptual diagrams showing examples of an augmented reality environment.

Some augmented reality scenarios may provide users with a certain level of interactivity. For example, the augmented reality scenario may provide a virtual "purchase" button or another virtual object (e.g., a button, slider, dial, etc.) that allows the user to control the scenario in some manner. As another example, an augmented reality video game may allow a user to manipulate virtual objects in the game.

Such control or manipulation of virtual objects may be accomplished using known interfaces. For example, in some cases, a user may "touch" or otherwise interact with the displayed virtual objects on a touchscreen of a mobile device. However, the display sizes of smartphones are typically fairly small relative to the size of a user's fingertip, which may make it difficult to precisely determine the user's intended target and/or action. In other cases, an input device such as a mouse or a keyboard or another interface may be used to control virtual objects displayed to the user.

In either of the interfaces described above, the user interaction may be less natural than an interaction that occurs within the virtual environment space itself (e.g., in front of the camera, where the virtual objects appear to be located). Using the techniques described here, a user may interact with virtual objects directly in the virtual environment, e.g., by moving a hand or another physical object in front of the camera to control or manipulate the virtual objects. The augmented reality system may then change the appearance of the virtual objects as the user interacts with them, giving the impression that the virtual objects are being influenced directly by the user—similarly to how real world objects are influenced directly by a user. Such interaction within the virtual environment may provide a more natural user interface and may enhance the user experience. Furthermore, in cases where the behavior of the virtual objects resembles that of similar real world objects, the way in which the virtual objects are intended to be used may be readily apparent to the user, e.g., without providing any additional instruction to the user. For example, an augmented reality button could be activated by the user moving a finger onto the button much like a real world button would be activated.

To provide for such interaction within the virtual environment, techniques are described to detect and track the user's hands (or other physical objects) in the virtual environment space using a two-dimensional camera, such as a standard camera found on most mobile devices. The user's hands or other control objects need not be a specific shape or color, nor do the hands or control objects need to include any type of distinctive markings. Furthermore, the camera does not need to be held in a fixed position, and so the techniques are amenable to real world mobile device usage scenarios, such as where a user is holding the mobile device in one hand while gesturing in the virtual environment space (e.g., pointing to an object that appears to be in front of the camera) with the other hand. Although much of the description that follows describes how the detection and tracking, e.g., of a user's hands, may be applied in the context of an augmented reality environment, it should be understood that such techniques may be used in more general contexts to provide a user interface to a computing system.

Figure 1B:
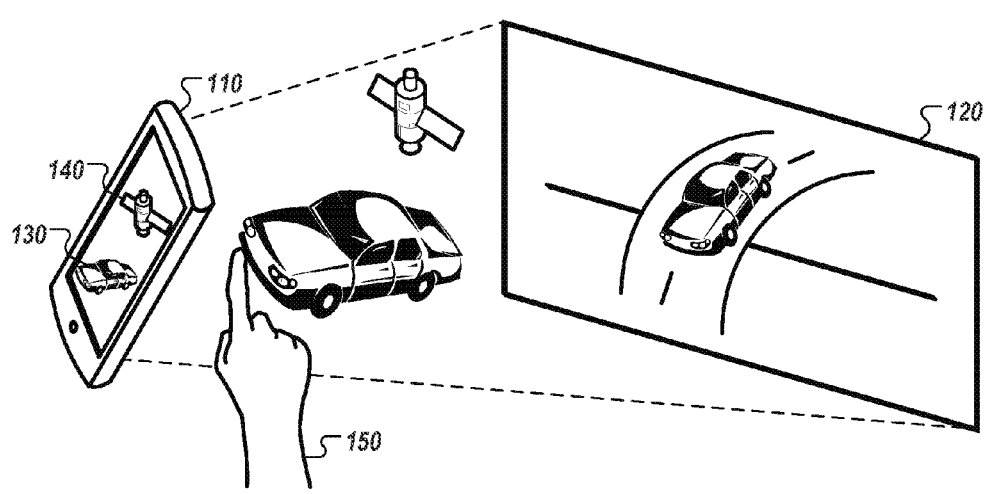
Figure 1C:
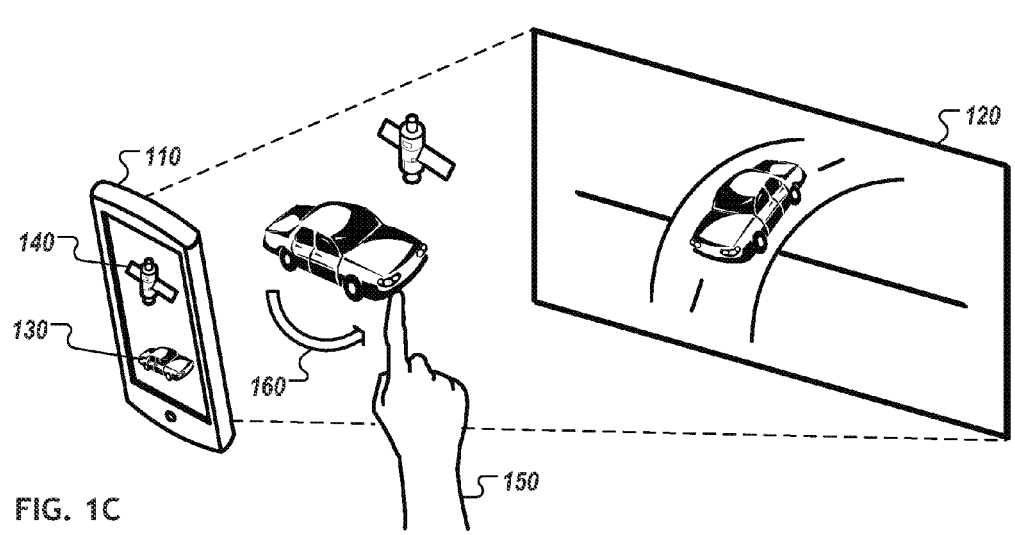

FIGS. 1A-1C are conceptual diagrams showing examples of an augmented reality environment. The augmented reality environment is shown at three sequential points in time. At all three points in time, the environment includes a mobile device 110 and a poster 120 that depicts a car driving on a road. The mobile device 110 and the poster 120 are real world physical objects. While the sequence of events shown in FIGS. 1A-1C is illustrative of a particular implementation of the techniques described herein, it should be understood that other sequences, events, or types of events are also within the scope of this disclosure.

FIG. 1A shows an example initialization phase, during which the mobile device 110 is pointed at the poster 120. In particular the camera of the mobile device 110 is pointed in a manner that captures the poster 120 in its field of view, and such that it does not capture any foreground objects. The poster 120 may be linked to and/or otherwise provide a trigger to initiate an augmented reality scenario, or the poster 120 may simply be in a location that is visible to the mobile device 110 when the augmented reality scenario is triggered. In the initialization phase, the poster 120 and any other objects within the field of view of the camera may be captured and stored as an initialization image, which depicts a background that is free of any foreground objects positioned between the background and the camera.

In FIG. 1B, the poster 120 has been brought to life using augmented reality. In particular, the view of the poster in the camera feed has been augmented to include two virtual objects 130 and 140, which are superimposed in the camera feed such that it appears (e.g., as displayed on mobile device 110) that the objects are positioned between the mobile device 110 and the poster 120. In some cases, the objects may be rendered using three-dimensional graphics techniques such that they appear to the user to be moving off the poster and towards the user. Of course, in the physical world, only the mobile device 110 and the poster 120 are actually present.

As shown in FIG. 1B, the user (or someone else) has placed a control object 150 in between the mobile device 110 and the poster 120. In this case, the control object 150 is the user's hand, but it should be understood that other control objects (e.g., a stylus, a wand, or another physical object) may also or alternatively be used in accordance with the techniques described here. The control object 150 may be any shape or color, and does not need to include any type of distinctive markings.

In the example, the control object 150 is used to "grab" the front right corner of the "car" virtual object in FIG. 1B. Then, as shown in FIG. 1C, the control object 150 gestures in a motion shown by arrow 160 to swing the virtual object 130 around in space as is shown to the user on device 110. Thus, the virtual object 130 is manipulated by a simple user gesture that occurs within the augmented reality environment space (e.g., in between the camera and the poster) where the virtual objects appear to be located.

As shown in FIGS. 1A-1C, the position of the camera in the mobile device 110 need not remain fixed with respect to the poster 120. Indeed, as shown at the different points in time, the mobile device 110 may be rotated or translated in space along any axis or along multiple axes. As such, the device may be tilted, or may be moved nearer to or farther from the poster 120, or may be jiggled, as long as the poster 120 remains in view of the camera. Regardless of such movement, the mobile device 110 will be able to detect and track the control object 150 with respect to the virtual objects displayed on its screen.

Figure 2:
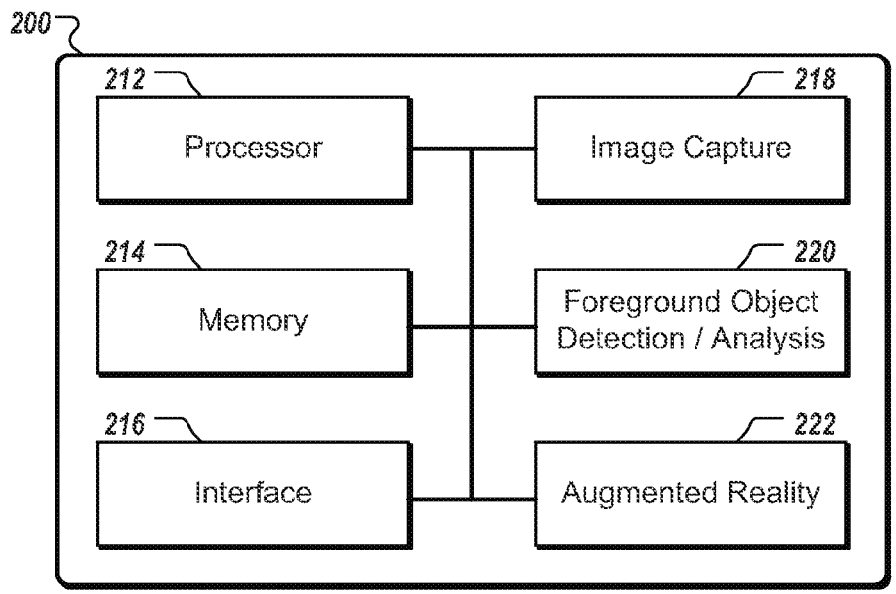
FIG. 2 is a block diagram of an example computing system for controlling an augmented reality object.

FIG. 2 is a block diagram of an example computing system 200 for controlling an augmented reality object. Computing system 200 may, in some implementations, be used to perform portions or all of the functionality described above with respect to the mobile device 110 of FIGS. 1A-1C. However, it should be understood that the computing system 200 may include any appropriate type of computing device, including for example smartphones, tablets, desktops, laptops, workstations, servers, or the like. In the case of a computing system 200 that does not have an integrated display, camera, and/or other functional components as described with respect to mobile device 110, an external display, camera, and/or other functional components may be communicatively coupled to the computing system 200.

As shown, the example computing system 200 may include a processor 212, a memory 214, an interface 216, an image capture device 218, a foreground object detection and analysis engine 220, and an augmented reality module 222. It should be understood that the components shown here are for illustrative purposes, and that in some cases, the functionality being described with respect to a particular component may be performed by one or more different or additional components. Similarly, it should be understood that portions or all of the functionality may be combined into fewer components than are shown.

Processor 212 may be configured to process instructions for execution by the computing system 200. The instructions may be stored on a non-transitory tangible computer-readable storage medium, such as in memory 214 or on a separate storage device (not shown), or on any other type of volatile or non-volatile memory that stores instructions to cause a programmable processor to perform the techniques described herein. Alternatively or additionally, computing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Interface 216 may be implemented in hardware and/or software, and may be configured, for example, to receive and respond to inputs provided by a user. The inputs may be provided to interface 216, e.g., via a user interface of the computing system. Example user interfaces of the computing system may include touchscreen devices, pointing devices, keyboards, voice input interfaces, visual input interfaces, or the like. Responses may also be provided by interface 216, e.g., via display on a display device, including touchscreen devices, or via other user interface mechanisms, including audio or haptic feedback, for example.

Image capture device 218 may be configured to capture video images (i.e. a series of sequential video frames) at any desired frame rate, or to take still images, or both. The image capture device 218 may be a still camera, a video camera, or other appropriate type of device that is capable of capturing images. The image capture device 218 may be configured to trigger image capture on a continuous, periodic, or on-demand basis. The image capture device 218 may capture a view of the entire field of view, or a portion of the field of view (e.g. a physical region, black/white vs. color, etc.) as appropriate. As used here, an image is understood to include a snapshot, a frame or series of frames (e.g., one or more video frames), a video stream, or other appropriate type of image or set of images.

In operation, the image capture device 218 may capture an initialization image, which depicts a background that is free of any foreground objects positioned between the background and the device. The initialization image may be stored by computing system 200, e.g., in memory 214. The image capture device 218 may also capture subsequent images over a period of time, e.g., after the initialization image is captured. The subsequent images may include the background as well as a foreground object, e.g., a control object that the user has placed in front of the image capture device 218.

Foreground object detection and analysis engine 220 may execute on processor 212, and may be configured to detect a foreground object in a feed from the image capture device 218. To detect the foreground object, engine 220 may receive the initialization image, e.g., from the image capture device 218 or from memory 214, and receive the subsequent images captured by the image capture device 218. Foreground object detection and analysis engine 220 may analyze the subsequent images to detect any foreground objects that were not present in the initialization image.

Foreground object detection and analysis engine 220 may also be configured to identify positioning, shape, and tracking information associated with the detected foreground objects. For example, the engine 220 may be used to determine a location of the foreground object, or a specific portion of the foreground object (e.g., a fingertip), in a particular image. In addition, the engine 220 may apply a gesture analysis to the detected foreground objects, e.g., to detect and track hand and/or finger-shaped regions, and to determine a particular gesture that is performed by the foreground object.

Augmented reality module 222 may execute on processor 212, and may be configured to manipulate an augmented reality object based on the location, movement, shape, and/or gesture of the detected foreground object. Augmented reality module 222 may be included as part of a downloadable app that provides the augmented reality functionality described above. For example, the app may operate on appropriate computing systems to display a camera feed augmented with virtual objects that are superimposed in the camera feed. The augmented reality module 222 may enhance such functionality by allowing the user to interact with virtual objects (e.g., using hand movements or gestures) directly in the augmented reality space where the virtual objects appear to be located.

Figure 3:
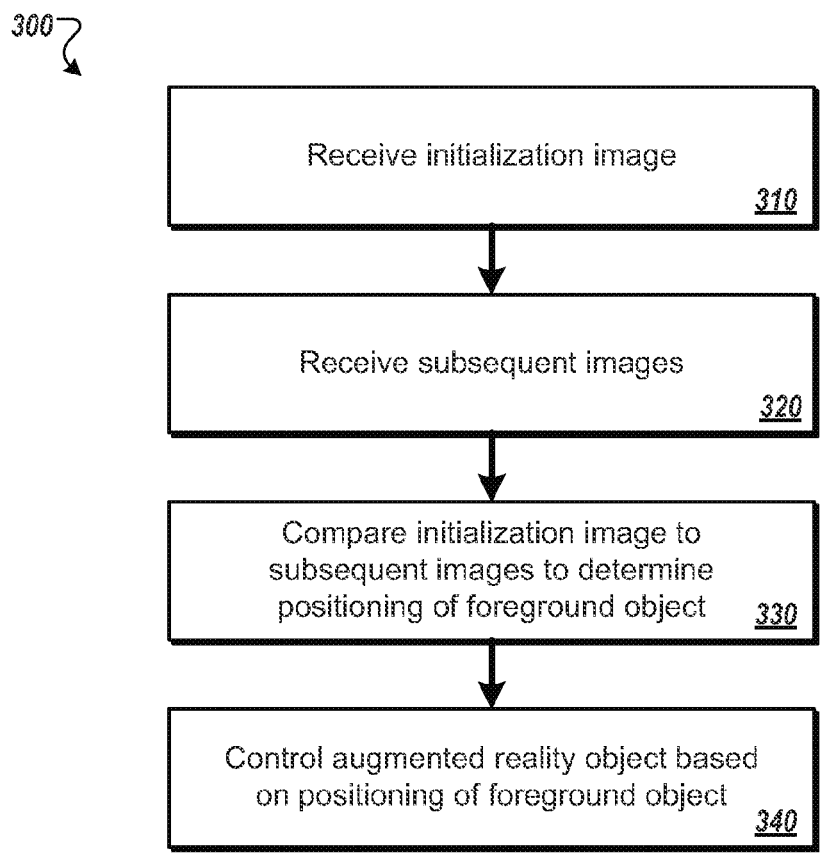
FIG. 3 is a flow diagram of an example process for controlling an augmented reality object.

FIG. 3 is a flow diagram of an example process 300 for controlling an augmented reality object. The process 300 may be performed, for example, by a mobile computing device such as the mobile device 110 illustrated in FIGS. 1A-1C, or by computing system 200 illustrated in FIG. 2. For clarity of presentation, the description that follows uses the computing system 200 as the basis of an example for describing the process. However, it should be understood that another system, or combination of systems, may be used to perform the process or various portions of the process.

Process 300 beings with an initialization phase, where an initialization image is received at block 310. The initialization image may be captured by a two-dimensional image capture device, such as a standard camera integrated with a mobile device, and may be stored in the memory of the mobile device. The initialization image depicts a background, e.g., the poster 120 of FIGS. 1A-1C, that may include one or more background objects. The initialization image does not include foreground objects positioned between the background and the image capture device.

In some implementations, the initialization image may be updated over time to include changes in the background. For example, if lighting conditions change in the environment, the background may get darker, while the initialization image shows the background under the original lighting conditions. In such cases, an updated initialization image that includes changes in the background may be generated and stored such that the updated initialization image reflects the current background. Similarly, if parts of the background were originally missing from the initialization image (e.g., based on the original pose of the image capture device) but have since been captured, the initialization image may be updated to include the missing portions. In general, any changes to the background from when the initialization image was originally captured may be provided in an updated initialization image. Upon updating the initialization image with an updated initialization image, the updated initialization image may be used in any subsequent comparisons performed, e.g., by foreground object detection and analysis engine 220.

At block 320, subsequent images are received. For example, a plurality of subsequent images may be captured by the image capture device over time. The subsequent images depict the background and one or more foreground objects that are positioned between the background and the image capture device.

At block 330, the subsequent images are compared to the initialization image to determine positioning of the foreground object or objects. In some cases, the subsequent images may be adjusted (e.g., prior to such comparison) to account for movement of the image capture device relative to the background such that the comparison is not affected by the movement. For example, if the initialization image showed the background at a certain angle, and the current view in a subsequent image shows the background at a different angle, the angular differences may be reversed in the subsequent image such that the background of the subsequent image is aligned with the background of the initialization image for comparison purposes. Although a simple rotational adjustment is described in the example above, it should be understood that arbitrarily complex adjustments and/or transformations are also within the scope of this disclosure.

The positioning of the foreground object may include, e.g., shape, size, and/or location information associated with the foreground object. The positioning of the foreground object may also be analyzed over a period of time to determine movement associated with the foreground object. In some cases, gesture analysis may be applied to the movement, e.g., to determine whether the user is performing a recognized gesture using the foreground object. One example of a recognizable gesture may include "grabbing" a virtual object by pointing to a point on the object, or by pinching two fingers together on the exterior of the object. In this example, after the object is grabbed, the user may perform additional movement with the foreground object, e.g., to rotate or otherwise move the object that was grabbed.

In some implementations, determining the positioning of the foreground object may include generating a foreground map based on differences between the initialization image and the subsequent images. For example, an RGB or YCC representation of an image may include a value associated with each of the pixels (or certain portions of the pixels) in the image. The system may compare corresponding pixels in the initialization image and a subsequent image to determine whether the values are equivalent or close to equivalent (e.g., substantially equivalent, but with some noise or other type of distortion), and may generate a foreground map of the pixels that are determined to be non-equivalent. In some implementations, the foreground map may describe a likelihood, e.g., for each pixel or for certain pixels in the subsequent images, that the pixels are part of the foreground object versus part of the background. Using such a likelihood map may be used to account for any noise or other distortion included in the subsequent image.

In some implementations, the likelihood that the pixels are part of the foreground object versus part of the background may be based on known and/or expected information about the foreground object. For example, if the system expects the foreground object to be the bare hand of a user, then the expected information about the foreground object may include a range of skin colors that may be expected in the foreground object. If multiple adjacent pixels fall within the range of skin colors, then those multiple adjacent pixels may be deemed more likely to be part of a user's hand, and such information may be considered when generating or refining the likelihood map. As another example, if the system expects the foreground object to be a particular object of a known color, then the known color may be expected to be found in a valid foreground object, which may increase the likelihood that pixels of that color are part of the foreground. Similarly, shape information may be considered in determining the likelihood that the pixels are part of a foreground object. For example, if a grouping of pixels is generally grouped in the shape of an expected foreground object (e.g., a hand, a stylus, a wand, etc.), then the likelihood that those pixels represent a foreground object is higher. In addition, information about where the foreground object is expected to be positioned may also be used in determining the likelihood of the object being a foreground object. For example, if there are particular regions in the image that are more likely to include a foreground object or more likely to not include a foreground object, then such information may be considered when generating or refining the likelihood map.

At block 340, an augmented reality object is controlled based on the positioning of the foreground object. For example, if a foreground object is positioned over a virtual button, then the virtual button may be activated. In some cases, the movement of the foreground object may be used to control the augmented reality object. For example, the user may "swing" a virtual tennis racquet or adjust a virtual slider by moving a finger through the air in front of the camera. In some cases, a specific gesture performed by the foreground object may be used to control the augmented reality object. For example, a virtual voting machine may be presented with "yes" or "no" choices, and the user may give a "thumbs up" or a "thumbs down" to indicate his or her voting preference, which may then be displayed on the virtual voting machine. As used here, gestures may include particular shapes and/or poses of a foreground object, motions associated with a foreground object, or combinations of shapes and/or poses and/or motions associated with the foreground object.

Figure 4A:
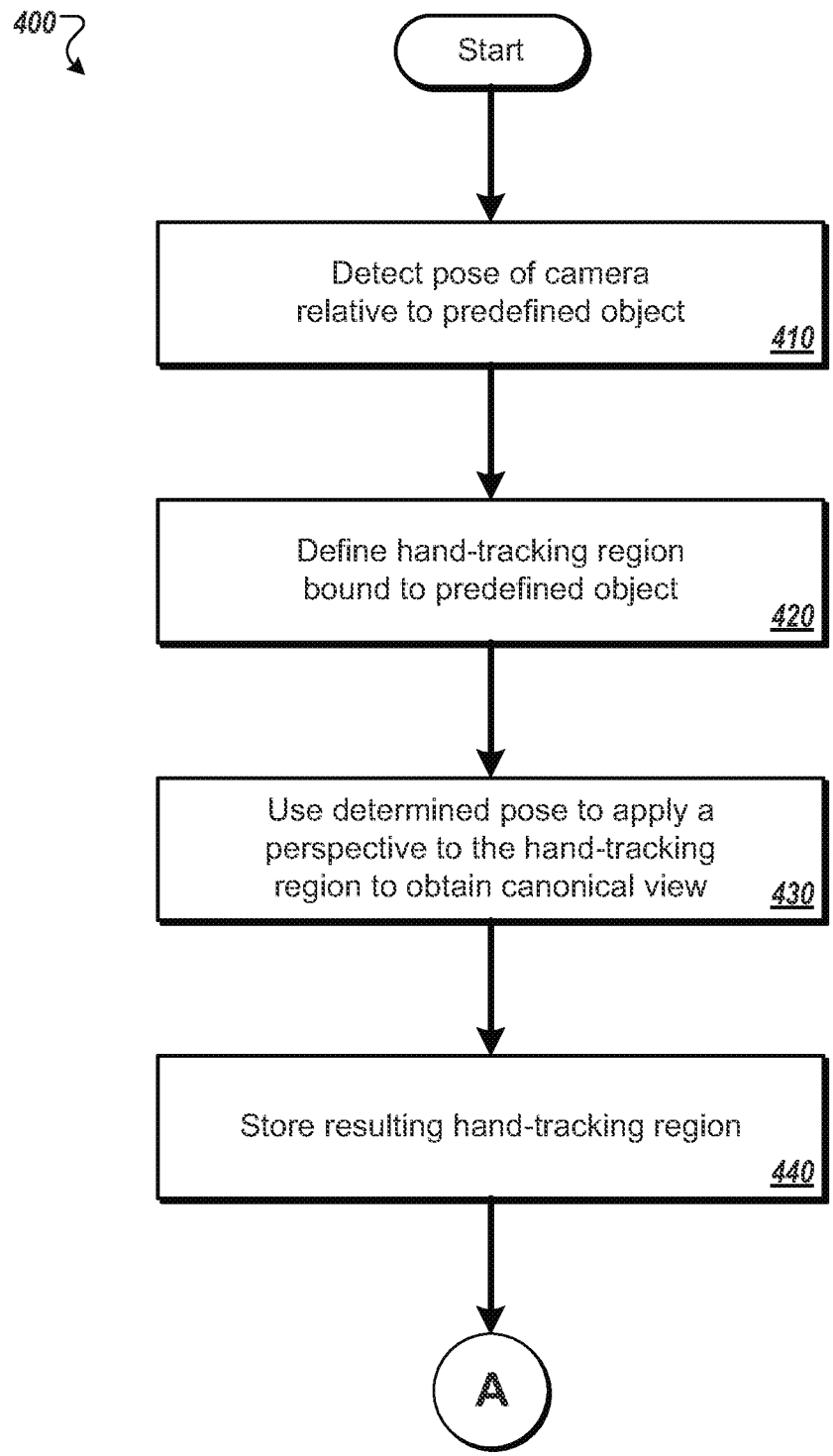
FIGS. 4A and 4B show a flow diagram of an example process for analyzing positioning and gestures of a foreground object.
Figure 4B:
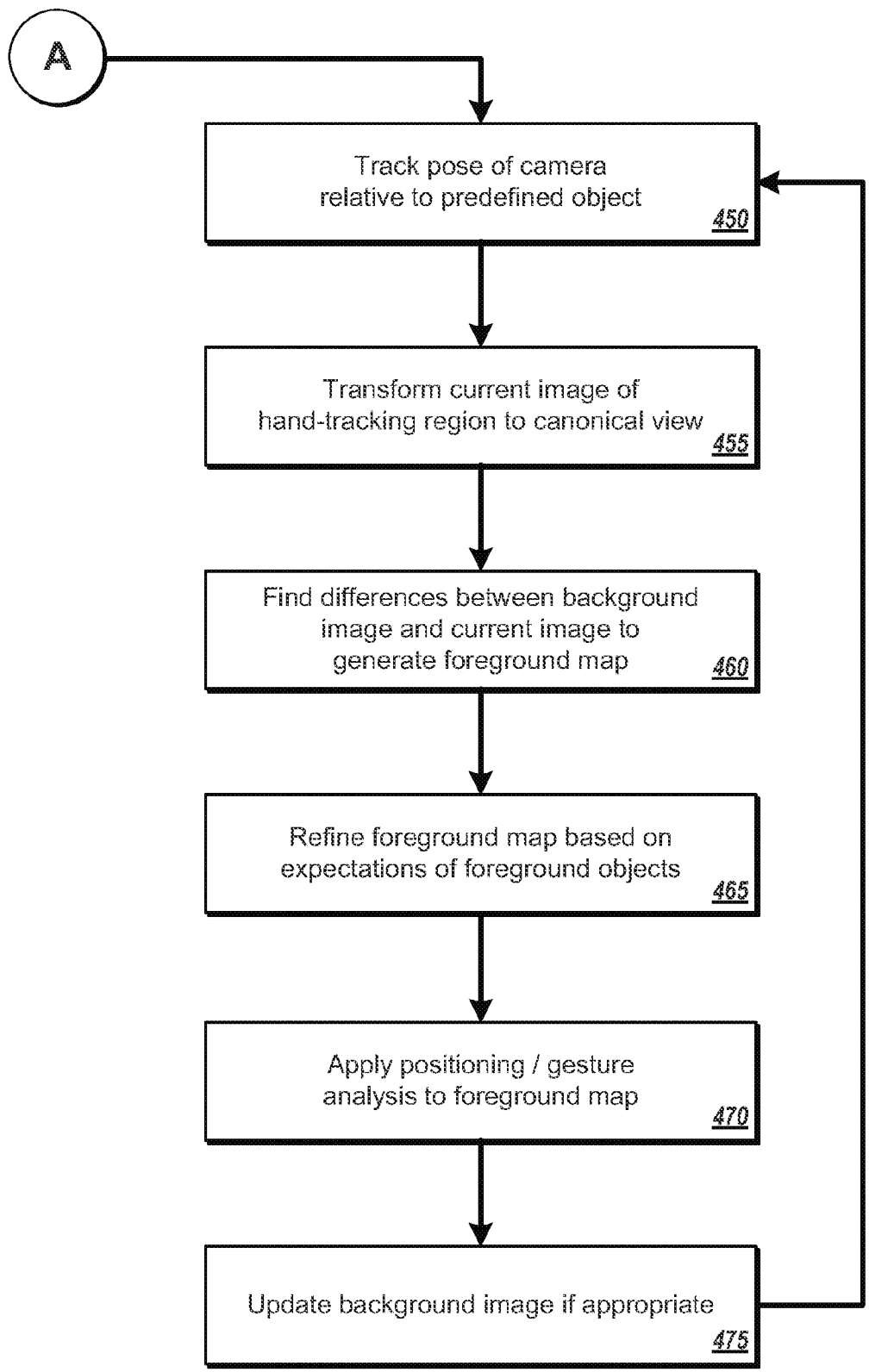

FIGS. 4A and 4B show a flow diagram of an example process 400 for analyzing positioning and gestures of a foreground object. The process 400 may be performed, for example, by the foreground object detection and analysis engine 220 illustrated as part of the computing system 200 in FIG. 2. For clarity of presentation, the description that follows describes tracking a hand as the foreground object, and uses the computing system 200 as the basis of an example for describing the process. However, it should be understood that the foreground object may be any appropriate object, and that another system, or combination of systems, may be used to perform the process or various portions of the process. In addition, it should be understood that the process 400 may be used more generally to detect and track foreground objects outside the context of an augmented reality scenario.

Process 400 begins with an initialization phase. Blocks 410-440 may all be included in the initialization phase, and may be performed a single time during process 400, whereas blocks 450-475 may be performed multiple times (e.g., several times every second). In some implementations, the initialization phase may be repeated as necessary, e.g., to update the information captured during the initialization phase.

The initialization phase begins at block 410 when a pose of the camera is detected relative to a predefined object. The pose of the camera may be detected using known techniques, such as point feature matching, blob matching, line matching, edge-based matching, or other appropriate techniques.

At block 420, the hand-tracking region is bound to the predefined object. This may be the whole background, or may be restricted to a smaller region. For example, in some implementations, a printed sheet of paper may be used as the predefined object, and the hand-tracking region may be defined to be the projection of the sheet of paper into the camera view.

At block 430, the determined pose is used to apply a perspective or affine warp to the hand-tracking region to obtain a canonical view. Continuing with the example above, the canonical view may be the front-on view of the sheet of paper. Alternatively, the canonical view may be defined to be the initial camera view, in which case this step can be omitted.

At block 440, the resulting hand-tracking region is stored. This hand-tracking region may be referred to as the background image. As such, at the end of the initialization phase, a background image against which later camera views are to be compared is stored, e.g., in memory, for purposes of later comparisons as described in step 460.

At block 450, the pose of the camera is tracked relative to the predefined object. At block 455, the region of the current camera image corresponding to the hand-tracking region is transformed to the canonical view.

At block 460, differences between the pixel colors and/or intensities in the transformed image and the stored background image are determined to produce a map of how likely each pixel is to be foreground (i.e. from the user's hand). The likelihood map may be referred to as the foreground map.

At block 465, the foreground map may be refined based on expectations associated with the foreground objects. For example, if a color camera is being used, a score may be assigned to each pixel in the current image that measures how likely the pixel is to be skin colored. This information may be combined with the likelihood map generated in block 460 to obtain a refined foreground map. Similarly, if a different object such as a pointer or stylus is expected, the pixel scores may be related to the expected object color. As another example, expected shape or positioning information may be used to refine the likelihood map generated in block 460. In some cases, a combination of these or other appropriate refinements may be implemented in block 465. In some implementations, noise-removal and/or spatial smoothing may be applied to the foreground map.

At block 470, positioning and/or gesture analysis may be applied to the foreground map. For example, in some implementations the system may detect and track sufficiently large hand and/or finger shaped regions, including the position of fingertips, and may use this as a controller for augmented reality video games. The detected motion, position, and/or gestures of the foreground object may then be used to interact with the computing system, e.g., as an input to the computing system.

At block 475, the stored background image may be updated if appropriate, e.g., if it has changed since originally being stored or if additional information becomes available. For example, in some implementations, the background image may be updated using corresponding parts of the current image for which the foreground map value is below a given threshold—e.g., to only update pixels that are very unlikely to be associated with a hand or finger (or other expected foreground object). In some cases, such updates may be used to account for changes in the background, e.g., due to changes in lighting, or due to improved information about the background.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method of controlling an augmented reality object, the method comprising:
receiving, at a computing device, an initialization image captured by an image capture device, the initialization image depicting a background and being free of foreground objects positioned between the background and the image capture device;
receiving, at the computing device, a plurality of subsequent images captured by the image capture device over a period of time, the plurality of subsequent images depicting the background and a foreground object, the foreground object being positioned between the background and the image capture device;
comparing, using the computing device, the initialization image to the plurality of subsequent images to determine positioning of the foreground object over the period of time; and controlling an augmented reality object being displayed by the computing device based on the positioning of the foreground object over the period of time, wherein comparing the initialization image to the plurality of subsequent images comprises adjusting the subsequent images to account for movement of the image capture device relative to the background such that the comparing is not affected by the movement.

2. The method of claim 1, further comprising analyzing the positioning of the foreground object over the period of time to determine movement associated with the foreground object.

3. The method of claim 2, wherein controlling the augmented reality object comprises controlling the augmented reality object in accordance with the movement associated with the foreground object.

4. The method of claim 1, wherein determining positioning of the foreground object comprises generating a foreground map based on differences between the initialization image and the subsequent images.

5. The method of claim 4, wherein the foreground map describes, for pixels in the plurality of subsequent images, a likelihood that the pixels are part of the foreground object versus the background.

6. The method of claim 5, wherein the likelihood that the pixels are part of the foreground object versus the background is based in part on expected information about the foreground object.

7. The method of claim 6, wherein the expected information about the foreground object comprises ranges of skin colors.

8. The method of claim 6, wherein the expected information about the foreground object comprises shape information.

9. The method of claim 6, wherein the expected information about the foreground object comprises likely regions where the foreground object will be positioned.

10. The method of claim 4, further comprising analyzing the foreground map over the period of time to determine a gesture performed by the foreground object.

11. The method of claim 10, wherein controlling the augmented reality object comprises controlling the augmented reality object in accordance with the gesture.

12. The method of claim 1, further comprising generating an updated initialization image that includes changes in the background, and wherein comparisons occurring after generation of the updated initialization image use the updated initialization image.

13. A system comprising:
one or more processors;
an image capture device to capture two-dimensional images;
an image processing module executing on at least one of the one or more processors to receive an initialization image from the image capture device, receive a subsequent image from the image capture device, analyze the subsequent image to detect a control object that was not present in the initialization image, and determine a location of the control object; and
an augmented reality module executing on at least one of the one or more processors to manipulate an augmented reality object based on the location of the control object,
wherein to analyze the subsequent image to detect a control object that was not present in the initialization image comprises to adjust the subsequent images to account for movement of the image capture device relative to a background such that the analysis is not affected by the movement.

14. A non-transitory computer-readable storage medium storing instructions that, when executed by a processor, cause the processor to:
receive an initialization image and subsequent interaction images from a two-dimensional image capture device, the subsequent interaction images including a control object that is not present in the initialization image;
determine movements of the control object based on differences between the initialization image and the subsequent interaction images;
adjust the subsequent images to account for movement of the two-dimensional image capture device relative to a background such that the determination of movements of the control object is not affected by the movement of the two-dimensional image capture device; and
control an augmented reality object displayed by the computing device in response to the movements of the control object.

* * * * *